United States Patent [19]
Burgess et al.

[11] Patent Number: 5,664,215
[45] Date of Patent: Sep. 2, 1997

[54] DATA PROCESSOR WITH AN EXECUTION UNIT FOR PERFORMING LOAD INSTRUCTIONS AND METHOD OF OPERATION

[75] Inventors: David P. Burgess; Marvin Denman; Milton M. Hood, Jr., all of Austin; Mark A. Kearney, Dallas, all of Tex.; Lavanya Kling, Palo Alto, Calif.; Graham R. Murphy; Seungyoon Peter Song, both of Austin, Tex.

[73] Assignees: Motorola, Inc., Schaumburg, Ill.; IBM, Armonk, N.Y.

[21] Appl. No.: 622,159

[22] Filed: Mar. 27, 1996

Related U.S. Application Data

[63] Continuation of Ser. No. 255,271, Jun. 3, 1994, abandoned.
[51] Int. Cl.$^6$ .................................................... G06F 9/38
[52] U.S. Cl. ................ 395/800.23; 395/569; 395/391; 395/393; 395/800.41
[58] Field of Search ............................ 395/800, 375, 395/569, 391, 393, 388, 390, 382, 383

[56] References Cited

U.S. PATENT DOCUMENTS 5,291,586  3/1994  Jen et al. ................................ 395/500
5,416,911  5/1995  Dinkjian et al. ....................... 395/375

OTHER PUBLICATIONS

Bandyopadhoya et al; "Micro-Code Based RISC Architecture"; IEEE, 1987.
Gary et al; "Power PC 603; A Microprocessor for Portable Computers": IEEE, Winter 94.

*Primary Examiner*—Larry D. Donaghue
*Attorney, Agent, or Firm*—Lee E. Chastain

[57] ABSTRACT

The disclosed data processor (10) dispatches load/store multiple and load/store string instructions to a load/store unit (28) as a sequence of simple load or store instructions. The sequencer unit (18) assigns an entry of a rename buffer (34) to which the load/store unit writes back the data of each simple load instruction. This strategy facilitates early data forwarding for subsequent instructions. Conversely, the sequencer unit supplies a rename buffer tag to the load/store unit if it is not able to supply the operands of a simple store instruction.

20 Claims, 3 Drawing Sheets

DATA PROCESSOR WITH AN EXECUTION UNIT FOR PERFORMING LOAD INSTRUCTIONS AND METHOD OF OPERATION

This application is a continuation of prior application Ser. No. 08/255,271, filed on Jun. 3, 1994, now abandoned entitled DATA PROCESSOR WITH AN EXECUTION UNIT FOR PERFORMING LOAD INSTRUCTIONS AND METHOD OF OPERATION.

FIELD OF THE INVENTION

The present invention generally relates to digital computing systems, and more specifically to load and store instructions.

BACKGROUND OF THE INVENTION

All data processors execute some instruction by which they move the results of their internal calculations to the remainder of the data processing system of which they are part and vice versa. The results of these calculations may be moved to an external memory system for storage and later use, to a CRT for display to a human user, or to a network for transmission to another data processing system. These instructions are often referred to as "store" or "write" instructions. Conversely, data may be moved from an external memory system or from an input/output ("I/O") device such as a keyboard to the data processing system where it is processed. These instructions are often referred to gas "load" or "read" instructions.

There are a wide variety of load/store instructions even within a particular computer architecture. A variety of load/store instructions eases the burden on the software programmer. These various instructions differ from each other in the amount of data transferred, the calculation of the address of the data source or destination, the format of the data, etc. One type of load/store instruction is a "load multiple" or "store multiple" instruction. These two instructions load the contents of a series of sequential memory locations into a series of sequential internal registers or vice versa during several processor clock cycles. The number of memory locations, the starting address of the memory address, and the starting address of the internal register are determined by the instruction format and its operands.

A load/store multiple instruction is a difficult instruction to implement in a pipelined data processor. Certain data processors, particularly reduced instruction set computers ("RISC") and some complex instruction set computers ("CISC"), overlap instruction processing to increase performance. This strategy is often defeated by a load/store multiple instruction. For instance, a single load multiple instruction may update every internal register. All subsequent instructions in the instruction stream must be delayed until the relevant data is available. Conversely, a single store multiple instruction may output every internal register. This instruction must be delayed until the data is available. Meanwhile, the store multiple instruction must be buffered in some type of internal queue. This strategy thereby precludes other instructions from using these resources.

SUMMARY OF THE INVENTION

In accordance with the present invention, there is disclosed a data processor with an execution unit for performing load instructions and method of operation which substantially eliminates disadvantages of known data processors and schemes.

The disclosed data processor has a plurality of architectural registers, a rename buffer, a load unit, and a sequencer unit connected to one another. The rename buffer has a plurality of entries for buffering a differing one of a plurality of results of a differing one of a plurality of instructions. For each load instruction-tag pair dispatched to it, the load unit requests data indexed by an address from a memory system. The load unit also buffers the data in one of the plurality of entries of the rename buffer as specified by the tag within the load instruction-tag pair. The sequencer unit receives a load multiple instruction requesting N*W bytes, where N and W are integers, where N is greater than one, and where each one of the plurality of architectural registers is W bytes in size. The sequencer unit then dispatches N load instruction tag-pairs to the load unit.

The disclosed method has the steps of, during a first time, receiving a load multiple instruction in a sequencer unit, and during N subsequent times, dispatching N load instruction-tag pairs to a load unit and storing a differing one of the plurality of entries of a rename buffer to a differing one of a plurality of architectural registers. The load multiple instruction requests N*W bytes of data, where N and W are integers, where N is greater than one and where each one of a plurality of architectural registers is W bytes in size. For each load instruction-tag pair dispatched to it, the load unit requests W bytes of data indexed by an address from a memory system. The load unit also buffers the W bytes of data in one of the plurality of entries of the rename buffer. The tag of the load instruction-tag pair identifies the particular indexed entry.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
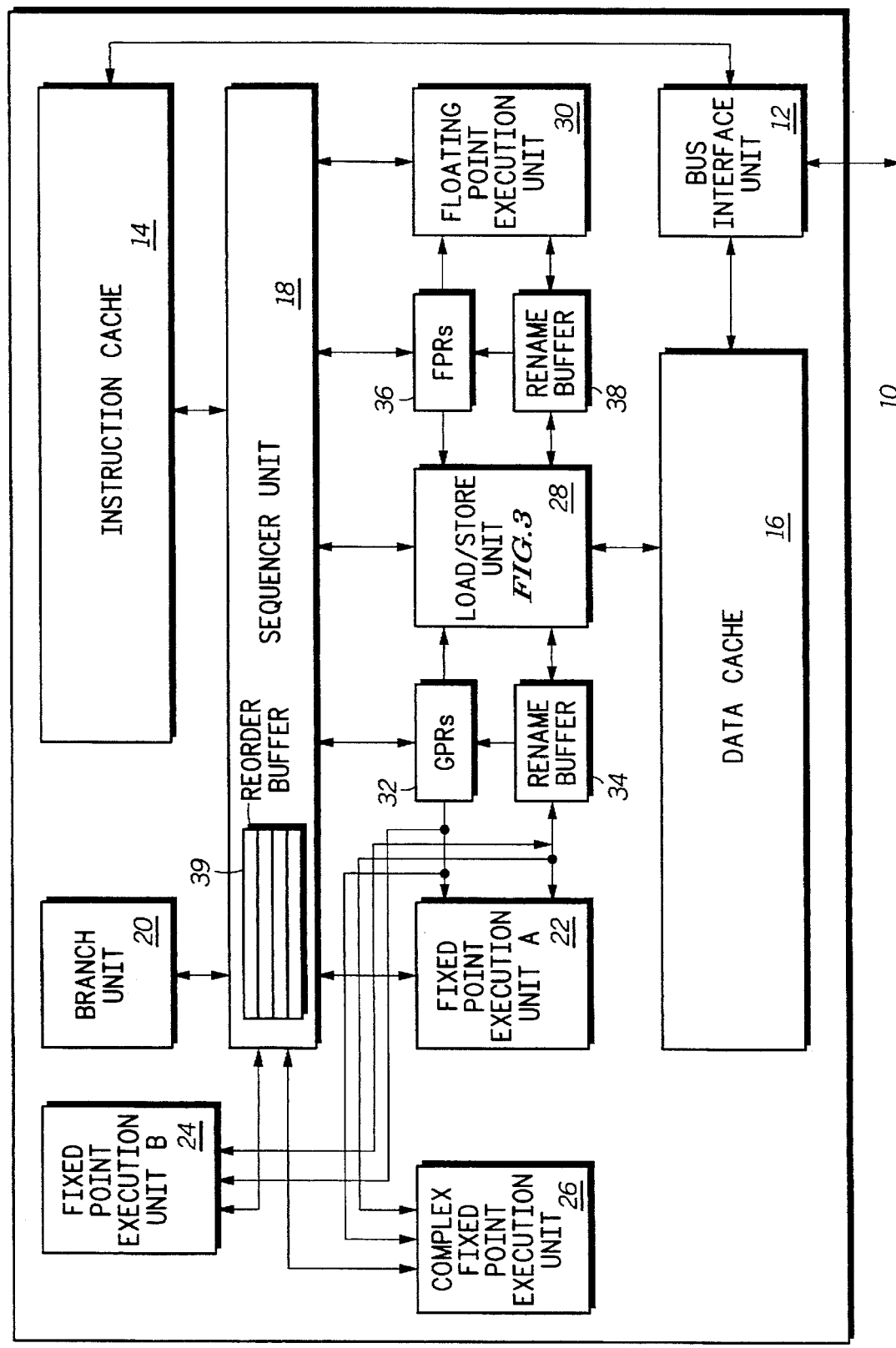
FIG. 1 depicts a block diagram of a data processor constructed in accordance with the present invention.

FIG. 1 depicts a block diagram of a data processor 10 constructed in accordance with the present invention. Data processor 10 implements the PowerPC Architecture instruction set. The PowerPC Architecture instruction set includes load/store multiple and load/store string instructions. Data processor 10 determines the existence of these instructions as it executes an instruction stream and "unrolls" or breaks these instructions into a sequence of individual load or individual store instructions. First instance, if data processor 10 encounters a store multiple instruction that outputs the contents of sixteen sequential internal registers to sixteen sequential memory locations, then data processor 10 dispatches sixteen single register store instructions. This strategy allows data processor 10 to use its renaming methodology for load/store multiple instructions. Also, data processor 10 can dispatch other instructions beyond a load/store multiple instruction.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. First rename buffer 34 is more fully described below in connection with FIGS. 3 and 4. Floating point execution unit 26 and load/store execution unit 28 read and write their results to a floating point architectural register file 36, (labeled FPRs and hereafter FPR file) and to a second rename buffer 38.

The operation of data processor 10 without the disclosed invention is known in the art. In general, branch unit 20 determines what sequence of programmed instructions is appropriate given the contents of certain data registers and the instructions themselves. Instruction cache 14 provides this sequence of programmed instructions to sequencer 18. If instruction cache 14 does not contain the required instructions, then it will fetch them from a main memory system external to data processor 10 (not shown).

Sequencer unit 18 dispatches the individual instructions of the sequence of programmed instructions to the various execution units 20, 22, 24, 26, 28 and 30. Sequencer unit 18 also reserves an entry in either rename buffer 34 or 38 in which to temporarily store the result, if any, of each instruction. Both rename buffers are first-in-first-out ("FIFO") queues.

Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution unit 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 maintains a reorder buffer 39 to coordinate this updating. Reorder buffer 39 is a FIFO queue that stores a portion of the programmed instruction stream in its original order. Sequencer unit 18 waits until the oldest instruction in reorder buffer 39 has completed. Then, sequencer unit 18 updates the architectural register with the result stored in the rename buffer entry allocated for the instruction. Sequencer unit 18 also invalidates the instruction's entry in reorder buffer 39 to make room for later instructions. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, or FPR file 36 at completion time and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required data, then it will fetch it from the main memory system external to data processor 10 via BIU 12. Load/store unit 28 is described below in connection with FIGS. 3 through 14.

The operation of data processor 10 with the disclosed invention is described below in connection with FIGS. 2 through 4. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining."

Figure 2:
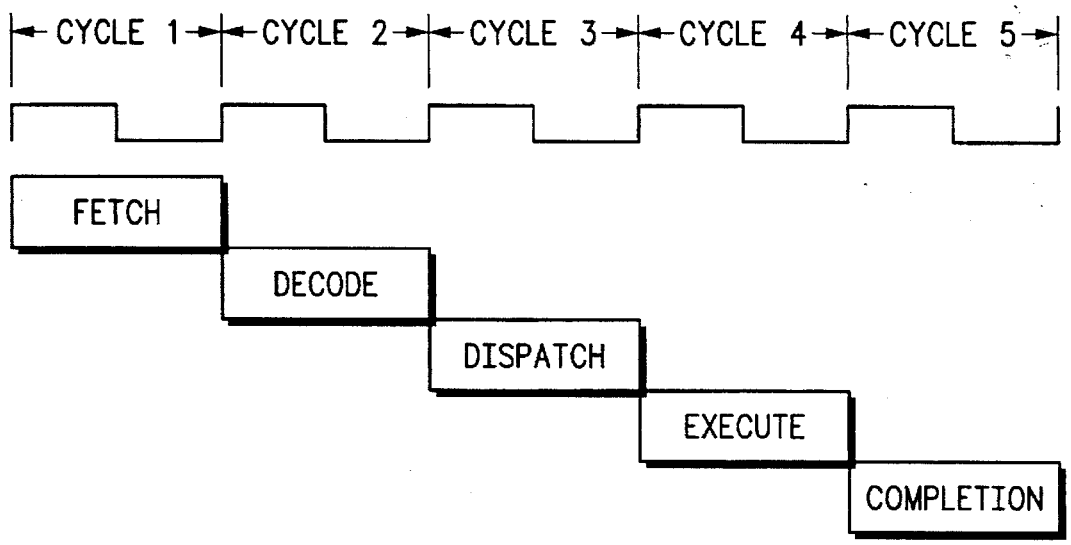
FIG. 2 depicts a timing diagram of an instruction executed by the data processor depicted in FIG. 1.

FIG. 2 depicts a timing diagram of an instruction executed by data processor 10 depicted in FIG. 1. In the depicted embodiment, each instruction is broken into five discrete steps: fetch, decode, dispatch, execute, and completion.

In the fetch stage, memory management circuitry (not shown) within instruction cache 14 retrieves one or more instructions beginning at a memory address identified by sequencer unit 18 or by branch unit 20 in the prior clock cycle.

In the decode stage, instructions are decoded by sequencer unit 18 into a number of control signals for use by subsequent stages. During this stage, sequencer unit 18 determines that a load/store multiple instruction exists.

In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched or, if one or more operands are not yet available, for supplying a tag identifying the rename buffer entry to which the operand will be written. Each one of the execution units stores its particular instruction in a reservation station until it receives all the necessary operand information to perform the instruction. Sequencer unit 18 breaks the single load/store multiple instruction into a series of simple load/store instructions. Sequencer unit 18 reserves a rename buffer entry for each one of the simple load instructions. Each simple load instruction will write its data initially to this specified entry. Later, sequencer unit 18 will copy this data to the corresponding architectural register. A subsequent instruction requiring the contents of one of the architectural registers will receive the tag specifying the rename buffer entry in which the data will be buffered. This strategy accelerates the dispatch of the subsequent instruction. Similarly, sequencer unit 18 forwards a rename buffer tag with each one of the simple store instructions. This tag identifies where the store data may be found first.

In the execute stage, each particular execution unit receives all (or some) of the necessary operand information and is therefore able to begin performing its programmed instruction. Results, if any, are returned either to first rename buffer 34 or second rename buffer 38, respectively, for integer and floating point results. Load/store unit 28 calculates the effective address of the destination memory location according to the load/store instruction's operands and its format. Load/store unit 28 may move the instruction into a load or store queue (FIG. 3). Data cache 16 also begins translating the calculated effective address into a real address. Data processor 10 uses an effective address internally to index each possible memory location and a real address externally to index each possible memory location. Data processor 10 maintains a table of address translations (not shown) to convert from one format to the other format.

A store instruction may require one or more additional execute stages. If the store instruction is not able to immediately access data cache 16, then the store instruction will remain in the store buffer as described below.

In the completion stage, sequencer unit 18 updates the architectural register files with the result of a particular instruction stored in a rename buffer after every instruction preceding the particular instruction has so updated the architectural register file. An instruction is the oldest instruction in reorder buffer 39 when this criteria is met. The completion stage also updates all other architectural states in the machine after every instruction preceding the particular instruction has so updated the architectural state. Store instructions are presented to data cache 16 when all instructions preceding them have completed.

Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

Figure 3:
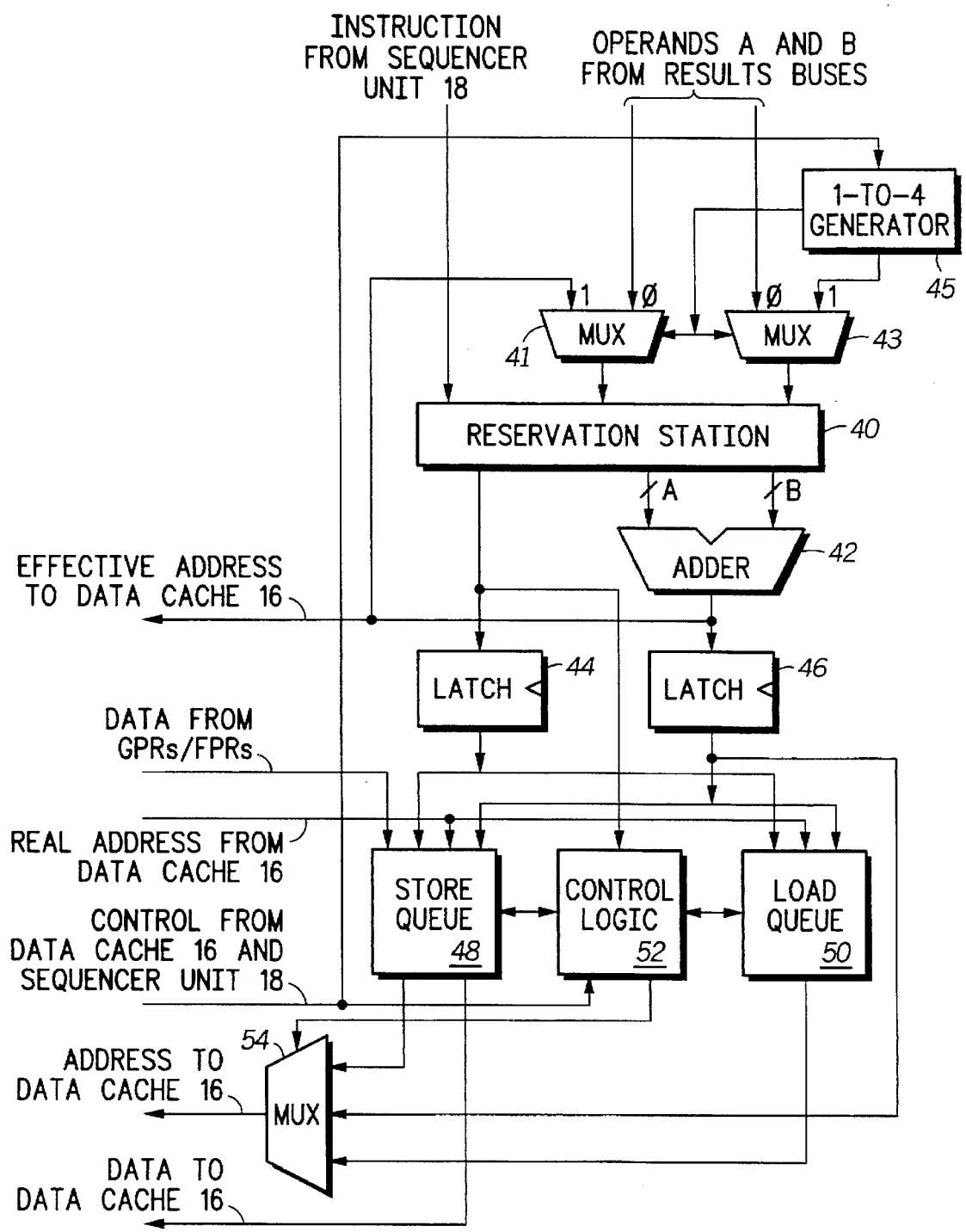
FIG. 3 depicts a block diagram of the load/store unit 28 depicted in FIG. 1.

FIG. 3 depicts a block diagram of load/store unit 28 depicted in FIG. 1. Load/store unit 28 has a reservation station 40 that stores various information about each load/store instruction. Reservation station 40 receives either a store instruction or a load instruction from sequencer unit 18 two operands, A and B, and a rename tag. The rename tag identifies the destination in one of the rename buffers of the load data, if any. A multiplexer ("MUX") 41 outputs one of two inputs to reservation station 40 as operand A. A multiplexer 43 outputs one of two inputs to reservation station 40 as operand B. Multiplexers 41 and 43 each receive one input from the result buses connected to GPR file 32 and to first rename buffer 34. Reservation station 40 forwards the two operands and the instruction to an adder 42 and to a latch 44, respectively. Adder 42 calculates an effective address of the source/destination of each load/store instruction by mathematically summing the two operands; The output of adder 42 is latched by a latch 46 and is forwarded to data cache 16 and to the second input of multiplexer 41. Latches 44 and 46 are clocked by a global periodic clocking signal (not shown). The second input of multiplexer 43 receives the output of a one-to-four generator 45. One-to-four generator 45 receives control information from sequencer unit 18, labeled "CONTROL," which it uses to select which inputs multiplexers 41 and 42 output to reservation station 40.

The instruction and effective address latched by latches 44 and 46 are forwarded to a store queue 48 and to a load queue 50. A control logic unit 52 selects which of the two queues latches the data depending upon the class of instruction. Control logic unit 52 receives the instruction opcode from reservation station 40 to facilitate this routing. Control logic unit 52 also receives various control signals from data cache 16 and from sequencer unit 18. Control logic unit 52 controls which of three inputs a multiplexer 54 outputs to data cache 16. Multiplexer 54 receives an address from latch 46, from store queue 48, and from load queue 50. The operation of control logic unit 52 is described below.

The operation of data processor 10 with respect to load and store operations is described below in two portions. These two portions generally follow the flow a load or a store instruction through data processor 10. First, the "unrolling" of a load/store multiple instruction into a series of simple load/store instruction is described. Second, the buffering of each simple load/store instruction in load queue 50 or store queue 48 is described.

LOAD/STORE MULTIPLE INSTRUCTION UNROLLING

Data processor 10 is an implementation of the PowerPC Architecture. The PowerPC Architecture instruction set defines three types of complex forms for both load and store instructions: (1) multiple word, (2) string word immediate, and (3) string word indexed.

Load Multiple Word "1 mw RT,D(RA)"

The load multiple word instruction loads the contents of N consecutive words (thirty-two bits per word) into N consecutive registers of GPR file 32, where N is an integer equal to (32-RT). By convention, the thirty-two registers of GPR file 32 are numbered zero through thirty-one. Each register of GPR file 32 is four bytes or one word wide. The data read by the load multiple instruction begins at the memory address specified by the sum of register RA (operand A) aid the field D (operand B). The data is loaded into the sequence of registers beginning with the register specified by RT.

Sequencer unit 18 decodes a load multiple word instruction and dispatches (32-RT) single load instructions to load/store unit 28. Sequencer unit 18 increments the destination register number (RT) of the load data by one for each subsequent load instruction. This destination is stored in rename buffer 34 to facilitate later routing of the data to the appropriate architectural register. Sequencer unit 18 assigns a different rename buffer entry and a different reorder buffer entry to each one of the (32-RT) instructions.

Sequencer unit 18 asserts a control signal to one-of-four generator 45 indicating that a particular dispatched instruction is a load multiple word instruction. Initially, one-of-four generator 45 causes multiplexers 41 and 43 to output the inputs coupled to the result buses. On each of the subsequent (31-N) load instructions, one-of-four generator 45 causes multiplexers 41 and 43 to output the inputs coupled to adder 42 and to one-of-four generator 45. One-of-four generator 45 also outputs the number four to multiplexer. Functionally, the output of the number four added to the previous effective address causes load/store unit 28 to request the next aligned word from data cache 16 or from the external memory system.

Control logic unit 52 writes back each load instruction to the different rename buffer entry specified by sequencer unit 18. This strategy allows subsequent instructions to access data for their calculations prior to updating the load instruction's architectural register, "data forwarding." Each load instruction is permitted access to data cache 16

"speculatively," as soon as it is dispatched. If necessary, each load instruction is permitted access to the external memory system "non-speculatively," when its reorder buffer 39 entry is the oldest entry.

Store Multiple Word "stmw RS,D(RA)"

The store multiple word instruction stores the contents of N consecutive registers of GPR file 32 into the contents of N consecutive memory words, where N is an integer equal to (32-RS). The store multiple instruction begins at the memory address specified by the sum of register RA (operand A) and the field D (operand B). The data is loaded into the sequence of registers beginning with the register specified by RS.

Sequencer unit 18 decodes a store multiple word instruction and dispatches (32-RS) single store instructions to load/store unit 28. Sequencer unit 18 increments the source register number (RS) of the store data by one for each subsequent store instruction. Sequencer unit 18 supplies the data (RS initially) from these registers to load/store unit 28 when the store instruction is the oldest instruction in data processor 10. (See description below.)

Sequencer unit 18 asserts a control signal to one-of-four generator 45 indicating that a particular dispatched instruction is a store multiple word instruction. Initially, one-of-four generator 45 causes multiplexers 41 and 43 to output the inputs coupled to the result buses. On each of the subsequent (31-N) store instructions, one-of-four generator 45 causes multiplexers 41 and 43 to output the inputs coupled to adder 42 and to one-of-four generator 45. One-of-four generator 45 also outputs the number four to multiplexer. Functionally, the output of the number four added to the previous effective address causes load/store unit 28 to index the next word in data cache 16 or in the external memory system.

Each store instruction is only permitted access to data cache 16 and to the external memory system "non-speculatively," when its reorder buffer 39 entry is the oldest entry.

Load String Word Immediate "lswi RT,RA,NB"

The load string word immediate instruction loads the contents of NB consecutive memory bytes into (NB/4, rounded-up to the next integer) consecutive registers of GPR file 32. The load string word immediate instruction begins at the memory byte address specified by the contents of register RA and at the register specified by RT. There is no "B effective address operand" in this instruction.

Sequencer unit 18 decodes a load string word immediate instruction and dispatches (NB/4, rounded-up to the next integer) single load instructions to load/store unit 28. Sequencer unit 18 increments the destination register of the load data by one for each subsequent load instruction. The destination register may "wrap around" from register thirty-one to register zero depending upon the values of NB and RT. Otherwise, the operation of sequencer unit 18 here is similar to its operation in a load multiple word instruction.

Sequencer unit 18 asserts a control signal to one-of-four generator 45 indicating that a particular dispatched instruction is a load string word immediate instruction. Initially, one-of-four generator 45 causes multiplexers 41 and 43 to output the inputs coupled to the result buses. Each load string word immediate instruction is either aligned or mis-aligned. The two least significant bits of the first byte in an aligned load string word immediate instruction are zero. The two least significant bits of the first byte in a mis-aligned load string word immediate instruction are not both zero. Load store unit 28 functions differently for aligned and mis-aligned load string word immediate instructions.

In an aligned load string word immediate instruction, control logic unit 52 makes (NB/4, rounded-up to the next integer) accesses to data cache 16. This operation is similar to the load multiple word instruction above.

In a mis-aligned load string word immediate instruction, load/store unit 28 makes (NB/4+1, rounded-up to the next integer) accesses to data cache 16. This strategy ensures that there is one write back operation to rename buffer 34 for each modified register. Otherwise, two cache accesses might be required to update three architectural registers. Initially, control logic unit 52 determines that a load string word immediate instruction is mis-aligned. One-to-four generator 45 causes multiplexers 41 and 43 to output the inputs coupled to the result buses. On each of the subsequent load instructions, one-to-four generator 45 causes multiplexers 41 and 43 to output the inputs coupled to adder 42 and to one-of-four generator 45. During the second load instruction, one-to-four generator 45 outputs one of the numbers one through four to multiplexer 45 which will index the aligned word immediately following the byte specified by RA. Load/store unit 28 can write the first register's new data to the appropriate entry of rename buffer 34 after completing two load instructions. Circuitry not depicted buffers mis-aligned data until four consecutive bytes can be loaded into a single entry of rename buffer 34. Thereafter, one-to-four generator outputs the number four. Load/store unit 28 can write each subsequent register's new data to the appropriate entry of rename buffer 34 after each subsequent load instruction. Finally, the last two load instructions are modified by control logic unit 52. The second to last load instruction only requests one byte. The last load instruction requests the remaining bytes (up to three) necessary to complete the load string word immediate instruction. Otherwise, the operation of sequencer unit 18 here is similar to its operation in a load multiple word instruction.

Store String Word Immediate "stswi RS,RA,NB"

The store string word immediate instruction stores the contents of (NB/4, rounded-up to the next integer) consecutive registers of GPR file 32 into the contents of NB consecutive memory bytes. The store string word immediate instruction begins at the memory address specified by the contents of register RA and at the register specified by RS. There is no "B effective address operand" in this instruction.

Sequencer unit 18 decodes a store string word immediate instruction and dispatches (NB/4, rounded-up to the next integer) single store instructions to load/store unit 28. Sequencer unit 18 increments the source register of the store data by one for each subsequent store instruction. Sequencer unit 18 supplies the data (RS initially) from these registers to load/store unit 28 when the store instruction is the oldest instruction in data processor 10. (See description below.) Otherwise, the operation of sequencer unit 18 here is similar to its operation in a store multiple word instruction.

Sequencer unit 18 asserts a control signal to one-of-four generator 45 indicating that a particular dispatched instruction is a store string word immediate instruction. Each store string word immediate instruction is either aligned or mis-aligned. The two least significant bits of the first byte in an aligned store string word immediate instruction are zero. The two least significant bits of the first byte in a mis-aligned store string word immediate instruction are not both zero. Load store unit 28 functions differently for aligned and mis-aligned store string word immediate instructions.

In an aligned store string word immediate instruction, load/store unit 28 makes (NB/4, rounded-up to the next integer) accesses to data cache 16. This operation is similar to the store multiple word instruction above.

In a mis-aligned store string word immediate instruction, load/store unit 28 makes (2*NB/4+1, rounded-up to the next integer) accesses to data cache 16. Load/store unit 28 generates a pair of accesses to data cache 16 for all but the final store instruction dispatched to it and a single access for the final store instruction. Initially, one-to-four generator 45 causes multiplexers 41 and 43 to output the inputs coupled to the result buses. Load/store unit 28 only writes the bytes programmed by the instruction to data cache 16. Control logic unit 52 repeats the same store instruction to complete a word aligned access. One-to-four generator 45 increments the second instruction's address to the next aligned word. Here, load/store unit 28 only writes the number of bytes necessary to total four when combined with the previous access to data cache 16. One-to-four generator and control logic 52 continue this process of splitting each mis-aligned word access into two halves until the final instruction. Then, control logic unit 52 need only make a single access to data cache 16.

Load String Word Indexed "lswx RT,RA,RB"

The load string word indexed instruction loads the contents of M consecutive memory bytes into (M/4, rounded-up to the next integer) consecutive registers of GPR file 32. M is a field in a special purpose register (not shown). The load string indexed instruction begins at the memory byte address specified by the sum of the contents of register RA and register RB and at the register specified by RT. Otherwise, the load string word indexed instruction is similar to the load string immediate instruction.

Store String Word Indexed "stswx RS,RA,RB"

The store string word indexed instruction stores the contents of (M/4, rounded-up to the next integer) consecutive registers of GPR file 32 into the contents of M consecutive memory bytes. M is a field in a special purpose register. The store string word indexed instruction begins at the memory address specified by the sum of the contents of register RA and register RB and at the register specified by RS. Otherwise, the store string word indexed instruction is similar to the store string immediate instruction.

SIMPLE LOAD/STORE INSTRUCTION BUFFERING

Sequencer unit 18 forwards a load or a store instruction to load/store unit 28 during the instruction's dispatch stage. Reservation station 40 latches the instruction and one each of (a) either operand A or a tag identifying the destination in rename buffer 34 or in rename buffer 38 of operand A when some other execution unit completes it, and (b) either operand B or a tag identifying the destination in rename buffer 34 or in rename buffer 38 of operand B when some other execution unit completes it. Reservation station 40 waits until both operands are available.

The load/store instruction's execution phase begins when both operands are available. Adder 42 calculates the effective address of the source/destination. Latches 44 and 46 latch the instruction and the instruction's address, enabling reservation station 40 to accept another instruction.

Sequencer unit 18 asserts a control signal to control logic unit 52 when it has completed all instructions preceding the load or store instruction. This action may or may not cause the instruction to immediately complete depending upon the contents of data cache 16, of store queue 48, and of load queue 50. An instruction is complete when it can no longer generate an exception. This scheduling strategy eliminates the possibility of having to "undo" a load or store instruction if some prior instruction causes an exception. Sequencer unit 18 also supplies the data to be stored by the instruction to store queue 48 at this time if the instruction is a store instruction.

Other portions of data processor 10 perform functions related to the load/store instruction. Data cache 16 translates the effective address generated by adder 42 into a real address and determines if it contains the data associated with the load or store instruction. If data cache 16 is able to translate the effective address, then it returns the real address to load/store unit 28. If data cache 16 is not able to translate the effective address, then it accesses specialized address translation tables in the memory system (not shown.) Later, data cache 16 will generate an interrupt signal when this access is complete and it is able to supply the translation. Control logic unit 52 will then store the translated address in the entry associated with the un-translated load or store instruction. Simultaneously, data cache 16 determines if it contains the data indexed by the real address. If data cache 16 contains the data requested by a load instruction, then data cache 16 returns the data to load/store unit 28 during the following clock cycle. Data cache 16 does not modify its memory until sequencer unit 18 indicates that the store instruction is the oldest instruction in data processor 10. If data cache 16 does not contain the data indexed by the real address, then it will request it from the memory system via BIU 12 after control logic unit 52 indicates that the instruction requesting the data is the oldest instruction in data processor 10.

Control logic unit 52 forwards select instructions from store queue 48 and load queue 50 to data cache 16 via multiplexer 54. Both queues are first-in-first-out ("FIFO") queues. Control logic unit 52 maintains various pointers to identify which entry in each queue should receive the next instruction and which entry may be presented to data cache 16. As described above, control logic unit 52 presents a load instruction address to data cache 16 if both the load and a store instruction are eligible at the same time. Control logic unit 52 can "present" a store instruction to data cache 16 (or update the memory system with the instruction data) as soon as the following clock cycle in which store queue 48 latches the instruction under certain circumstances: (1) if the various pointers indicate that the instruction is the next instruction to be so presented, (2) if data cache 16 was able to translate the instruction's address in the previous clock cycle, and (3) if data cache 16 determines that it contains the indexed data. Otherwise, control logic unit 52 delays the presentation of the store instruction to data cache 16 for at least one additional clock cycle. In both cases, control logic unit 52 buffers the instruction in the next available entry in store queue 48. Control logic unit 52 presents a load instruction to data cache 16 as soon as adder 42 calculates the effective address of the instruction. If data cache 16 is able to translate the instruction's address, and if data cache 16 contains the indexed data, then the load instruction is considered fully executed. Otherwise, control logic unit 52 buffers the load instruction in the next available entry in load queue 50.

Continuing with FIG. 3, control logic unit 52 buffers store instructions in store queue 48. Store queue 48 is a six entry static random access memory ("SRAM") structure. Each of the six entries contains one hundred and thirty-eight bits: seventy bits storing a portion of the store instruction's opcode and data attributes, sixty-seven bits storing the store instruction's real address, and a valid bit indicating a valid real address field. Control logic unit 52 maintains four pointers for store queue 48: an OLDEST MISS pointer, a NEXT ACCESS pointer, a COMPLETE pointer, and a DISPATCH pointer. As will become apparent from the following description, the OLDEST MISS pointer is always behind or equal to the NEXT ACCESS pointer, the NEXT ACCESS pointer is always behind or equal to the COMPLETE pointer, and the COMPLETE pointer is always behind or equal to the DISPATCH pointer. Initially, all four pointers indicate the same entry in store queue 48.

Control logic unit 52 buffers each new store instruction in the entry indexed by the DISPATCH pointer. Control logic unit 52 stores the instruction's translated address in the same entry's real address field when data cache 16 provides it. Control logic unit 52 also increments or advances the DISPATCH pointer by one when it receives the real address.

As described above, sequencer unit 18 asserts a control signal and supplies the store data indicating that load/store unit 28 may complete a store instruction. Control logic unit 52 buffers the store data in the data field of the entry specified by the COMPLETE pointer. Control logic unit 52 also increments the COMPLETE pointer by one when it receives the store data.

Control logic unit 52 forwards the real address and store data of the instruction indexed by the NEXT ACCESS pointer to data cache 16 when it has no higher priority load instructions. Control logic unit 52 increments the NEXT ACCESS pointer by one. If the access is successful, then data cache 16 modifies the contents of the appropriate memory location and control logic unit 52 invalidates the entry's valid bit. If the access is not successful, then load/store unit 28 must wait for data cache 16 and BIU 12 to retrieve the data from the external memory system. Data cache 16 asserts a control signal when it receives valid data from the external memory system. Control logic unit 52 then re-presents the address indexed by the OLDEST MISS pointer to data cache 16. It should be understood that control logic unit 52 will continue to present the store instruction indexed by the NEXT ACCESS pointer to data cache 16 after a miss. These subsequent presentations may or may not "hit" in data cache 16.

Finally, control logic unit 52 increments the OLDEST MISS pointer to the next valid entry or to the DISPATCH POINTER if there are no other valid entries when the entry currently indexed by the current entry becomes invalid.

Control logic unit 52 buffers load instructions in load queue 50. Load queue 50 is a four entry SRAM structure. Each of the four entries contains sixty-five bits: thirty-two bits storing a portion of the load instruction's opcode and data attributes, thirty-two bits storing the load instruction's real address, and a valid bit indicating a valid real address field. Control logic unit 52 maintains two pointers for load queue 50: a HEAD pointer and a TAIL pointer. As will become apparent from the following description, the HEAD pointer is always behind or equal to the TAIL pointer. Initially, both pointers indicate the same entry in load queue 50.

Load/store unit 28 forwards each load instruction directly to data cache 16 after adder 42 generates the load instruction's effective address. This scheduling reflects the priority of load instructions relative to store instructions. If data cache 16 is able to translate the effective address into a real address and if data cache 16 contains the requested data, then data cache 16 forwards the data to rename buffer 34 or 38. If data cache 16 is not able to translate the address, then the load instruction waits in latches 44 and 46 until data cache 16 can so translate the address. If data cache 16 does not contain the data, then control logic unit 52 stores the load instruction in the entry indexed by the TAIL pointer. In the depicted embodiment, data cache 16 does not request the load instruction data from the external memory system until sequencer unit 18 indicates that all instructions preceding the load instruction have written back their results to the various architectural registers of data processor 10. This strategy avoids speculative data load operations to the external memory system. Control logic unit 52 increments the TAIL pointer by one when it receives the real address. Control logic unit 52 also sets the valid bit of the entry indicating a valid real address field.

As described above, sequencer unit 18 asserts a control signal indicating that load/store unit 28 may complete a load instruction. Control logic unit 52 forwards the real address of the load instruction indexed by the HEAD pointer to data cache 16. If data cache 16 is able to supply the requested data, then data cache 16 forwards the data to the result buses via load/store unit 28, control logic unit 52 increments the HEAD pointer by one, and control logic unit 52 clears the instruction's valid bit. If data cache 16 is not able to supply the requested data, then load/store unit 28 must wait for data cache 16 and BIU 12 to retrieve the data from the external memory system. Data cache 16 directly forwards the received data to the appropriate result bus via load/store unit 28 and asserts a control signal to control logic unit 52. Control logic unit 52 then increments the HEAD pointer.

Figure 4:
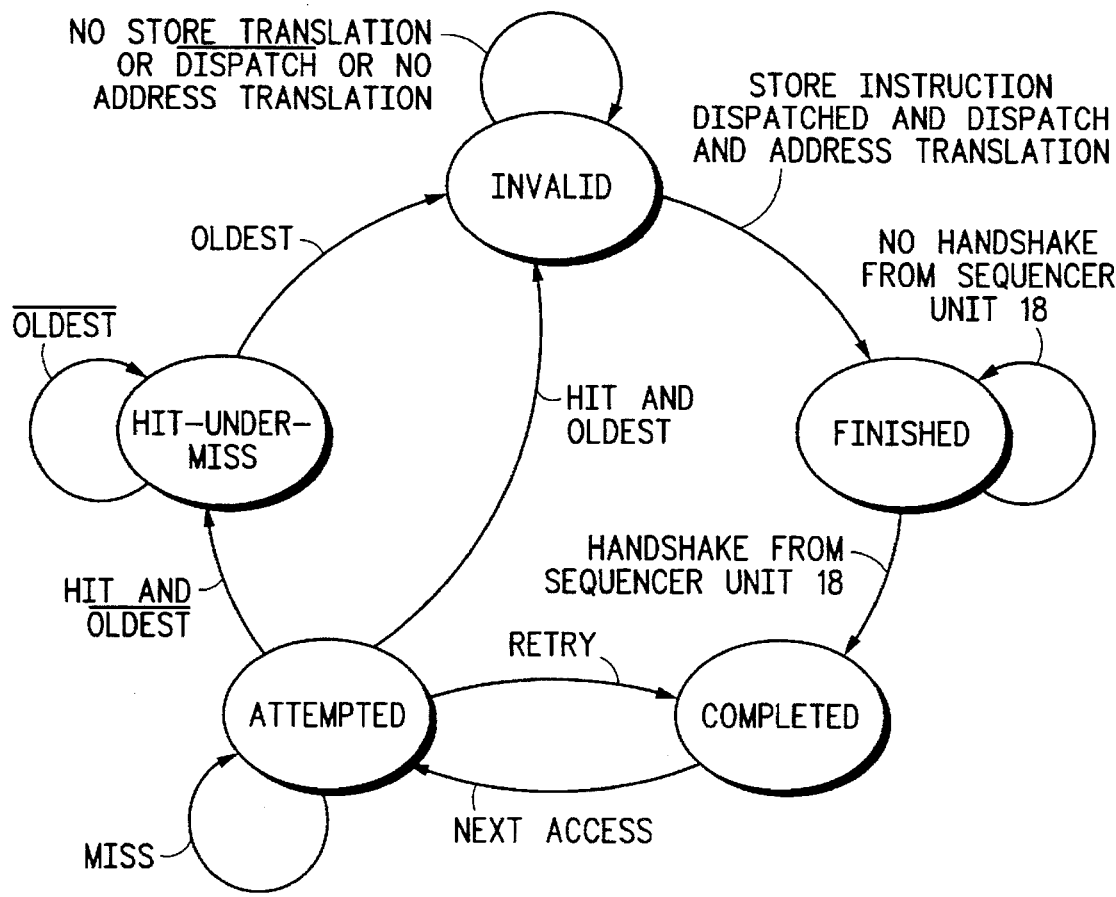
FIG. 4 depicts a state-transition diagram illustrating the possible states in which each entry of the store queue depicted in FIG. 3 may be.

FIG. 4 depicts a state-transition diagram illustrating the possible states in which each entry of store queue 48 depicted in FIG. 3 may be. Each of the six entries in store queue 48 may be in one and only one of the five depicted states: INVALID, FINISHED, COMPLETED, ATTEMPTED or HIT-UNDER-MISS. The particular values of the four store pointers, OLDEST MISS, NEXT ACCESS, COMPLETE, and DISPATCH, each entries valid bit, and the operation of data processor 10 determine in which state the entry is.

Each of the six entries in store queue 48 is initially in an INVALID state. Each entry between the OLDEST MISS pointer up to and including the DISPATCH pointer is in the INVALID state. Eventually, sequencer unit 18 dispatches enough store instructions to load/store unit 28 to cause the DISPATCH pointer to index the particular entry. Control logic unit 52 then buffers the next store instruction dispatched to load/store unit 18 in the entry. Data cache 16 translates the particular entry's effective address into a real address and forwards this address to load/store unit 28. Control logic unit 52 sets the particular entry's valid bit upon receipt of the translated address. The state of this particular entry then transitions from the INVALID STATE to the FINISHED state. The particular entry remains in this state until sequencer unit 18 indicates that the store instruction stored in the entry is the oldest instruction in data processor 10. Each entry between the DISPATCH pointer up to and including the COMPLETE pointer is in the FINISHED state.

Eventually, sequencer unit 18 signals to control logic unit 52 that the store instruction stored in the entry indicated by the COMPLETE pointer is the oldest instruction in data processor 10. At this point, every instruction that preceded the store instruction in the program order has updated the appropriate architectural register or, if no update is required, has reached a point in its operation after which it can not generate an exception. It is now safe to write data to the external memory system without threat of having to "undo" the store instruction. The state of this particular entry transitions from the FINISHED state to the COMPLETED state. Each entry between the COMPLETE pointer up to and including the NEXT ACCESS pointer is in the COMPLETED state.

Control logic unit 52 presents a store address-data pair to data cache 16 when the NEXT ACCESS pointer indexes the entry containing the store address-data pair and there are no higher priority operations. At this point, the particular entry transitions to the ATTEMPTED state. The state of the entry may return to the COMPLETED state if data cache 16 asserts the control signal RETRY. Data cache 16 asserts the control signal RETRY when it is unable to service store instructions because, for instance, data cache 16 receives data from BIU 12, data cache 16 accesses specialized address translation tables, etc. Each entry, whose valid bit is set, between the NEXT ACCESS pointer up to and including the OLDEST MISS pointer is in the ATTEMPTED state.

There are two possible results after control logic unit 52 presents a store address-data pair to data cache 16. Data cache 16 either contains the data, a "hit," or does not contain the data, a "miss."

In the data cache hit case, the entry transitions to either the HIT-UNDER-MISS state or the INVALID state. The entry transitions to the HIT-UNDER-MISS state if the OLDEST MISS pointer does not identify it as the oldest valid store instruction. Conversely, the entry transitions to the INVALID state if the OLDEST MISS does identify it as the oldest valid store instruction. In both cases, control logic unit 52 clears the entry's valid bit. Each entry, whose valid bit is cleared, between the COMPLETE pointer up to the OLDEST MISS pointer is in the HIT-UNDER-MISS state.

In the data cache miss case, the particular entry containing the presented store address data pair remains in the ATTEMPTED state.

A particular entry remains in the HIT-UNDER-MISS state so long as the OLDEST MISS pointer does not identify it as the oldest valid store instruction. The entry transitions to the INVALID state when OLDEST MISS pointer identifies it as the oldest valid store instruction.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 10. It is to be understood therefore, that the invention encompasses all such modifications that do not depart from the spirit and scope of the invention as defined in the appended claims.

What is claimed is:

1. A data processor with an execution unit for performing load instructions, the data processor comprising:

a plurality of architectural registers;

a rename buffer coupled to the plurality of architectural registers, the rename buffer comprising a plurality of entries, each one of the plurality of entries buffering a differing one of a plurality of results of a differing one of a plurality of instructions, the rename buffer updating the contents of the plurality of architectural registers according to a predetermined order;

a load unit coupled to the rename buffer, for each load instruction-tag pair dispatched to it, the load unit requesting data indexed by an address from a memory system and buffering the data in one of the plurality of entries of the rename buffer indexed by a tag, the load instruction-tag pair comprising the tag identifying one of the plurality of entries of the rename buffer; and a sequencer unit coupled to the load unit, the sequencer unit receiving a load multiple instruction, the load multiple instruction requesting N*W bytes, where N and W are integers, where N is greater than one, and where each one of the plurality of architectural registers is W bytes in size, the sequencer unit dispatching a differing one of the N load instruction tag-pairs to the load unit as one of the plurality of entries is made available for use by the completion of a non-complex instructions.

2. The data processor of claim 1 wherein the sequencer unit dispatches one address to the load unit and wherein the load unit further comprises address calculation means generating (N−1) addresses of (N−1) ones of the N load instruction-tag pairs.

3. The data processor of claim 2 wherein the address calculation means comprises:

an adder for summing an output of a first multiplexer and an output of a second multiplexer;

the first multiplexer for alternately outputting either a first field of each of the N load instruction-tag pairs or the number W;

the second multiplexer for alternately outputting either a second field of each of the N load instruction-tag pairs or an output of the adder; and control circuitry for selecting the inputs of the first and second multiplexer.

4. The data processor of claim 3 wherein the sequencer unit further comprises a reorder buffer storing a sequence of dispatched instructions and wherein the sequencer unit copies one of the plurality of entries of the rename buffer to one of the plurality of architectural registers responsive to the sequence.

5. The data processor of claim 4 wherein the memory system and the data processor are fabricated on the same semiconductor substrate.

6. The data processor of claim 5 wherein, for each store instruction dispatched to the load unit, the load unit storing data indexed by the address to the memory system, and wherein the sequencer unit receives a store multiple instruction, the store multiple instruction storing M*W bytes, where M is an integer greater than one, the sequencer unit dispatching M store instructions to the load unit.

7. The data processor of claim 1 wherein the sequencer unit further comprises a reorder buffer storing a sequence of dispatched instructions and wherein the sequencer unit copies one of the plurality of entries of the rename buffer to one of the plurality of architectural registers responsive to the sequence.

8. The data processor of claim 7 wherein the memory system and the data processor are fabricated on the same semiconductor substrate.

9. The data processor of claim 8 wherein, for each store instruction dispatched to the load unit, the load unit storing data indexed by the address to the memory system, and wherein the sequencer unit receives a store multiple instruction, the store multiple instruction storing M*W bytes, where M is an integer greater than one, the sequencer unit dispatching M store instructions to the load unit.

10. The data processor of claim 1 wherein the memory system and the data processor are fabricated on the same semiconductor substrate.

11. The data processor of claim 10 wherein, for each store instruction dispatched to the load unit, the load unit storing data indexed by the address to the memory system, and wherein the sequencer unit receives a store multiple instruction, the store multiple instruction storing M*W bytes, where M is an integer greater than one, the sequencer unit dispatching M store instructions to the load unit.

12. A method of operating a data processor with an execution unit for performing load instructions, the method comprising the steps of:

during a first time,
receiving a load multiple instruction in a sequencer unit, the load multiple instruction requesting N*W bytes of data, where N and W are integers, where N is greater than one and where each one of a plurality of architectural registers is W bytes in size;

during N subsequent times,
first individually dispatching N load instruction tag-pairs to a load unit as one of a plurality of entries is made available for use by the completion of a non-complex instructions, where each of the N load instruction-tag pairs comprises a tag identifying one of the plurality of entries of a rename buffer, for each load instruction-tag pair dispatched to it, the load unit requesting W bytes of data indexed by an address from a memory system and buffering the W bytes of data in one of the plurality of entries of the rename buffer indexed by the tag of the load instruction-tag pair, the step of first individually dispatching occurring as one of the plurality of entries is available for use; and storing a differing one of the plurality of entries of the rename buffer to a differing one of the plurality of architectural registers according to a predetermined order.

13. A method of claim 12 further comprising the steps of:

during a second time,
receiving a store multiple instruction in the sequencer unit, the load multiple instruction storing M*W bytes of data, where M is an integer greater than one; and during M subsequent times, second dispatching M store instructions to the load unit, for each store instruction dispatched to it, the load unit storing W bytes of data indexed by an address to the memory system.

14. The method of claim 13 further comprising the steps of:

during the second through Nth ones of the N subsequent times, calculating the address in the load unit.

15. The method of claim 14 wherein the step of storing further comprises the step of storing a differing one of the plurality of entries of the rename buffer to a differing one of the plurality of architectural registers responsive to a sequence of instructions stored in a reorder buffer.

16. The method of claim 15 wherein the step of first dispatching comprises the step of dispatching N load instruction tag-pairs to the load unit, the load unit requesting data indexed by the address from a memory system fabricated on the same semiconductor substrate as the data processor.

17. The method of claim 12 wherein the step of storing further comprises the step of storing a differing one of the plurality of entries of the rename buffer to a differing one of the plurality of architectural registers responsive to a sequence of instructions stored in a reorder buffer.

18. The method of claim 17 wherein the step of first dispatching comprises the step of dispatching N load instruction tag-pairs to the load unit, the load unit requesting data indexed by the address from a memory system fabricated on the same semiconductor substrate as the data processor.

19. The method of claim 12 wherein the step of storing further comprises the step of storing a differing one of the plurality of entries of the rename buffer to a differing one of the plurality of architectural registers responsive to a sequence of instructions stored in a reorder buffer.

20. The method of claim 12 wherein the step of first dispatching comprises the step of dispatching N load instruction tag-pairs to the load unit, the load unit requesting data indexed by the address from a memory system fabricated on the same semiconductor substrate as the data processor.

* * * * *